June 13, 1939. G. W. EMRICK 2,162,251
TAPPING ATTACHMENT
Filed Dec. 16, 1938
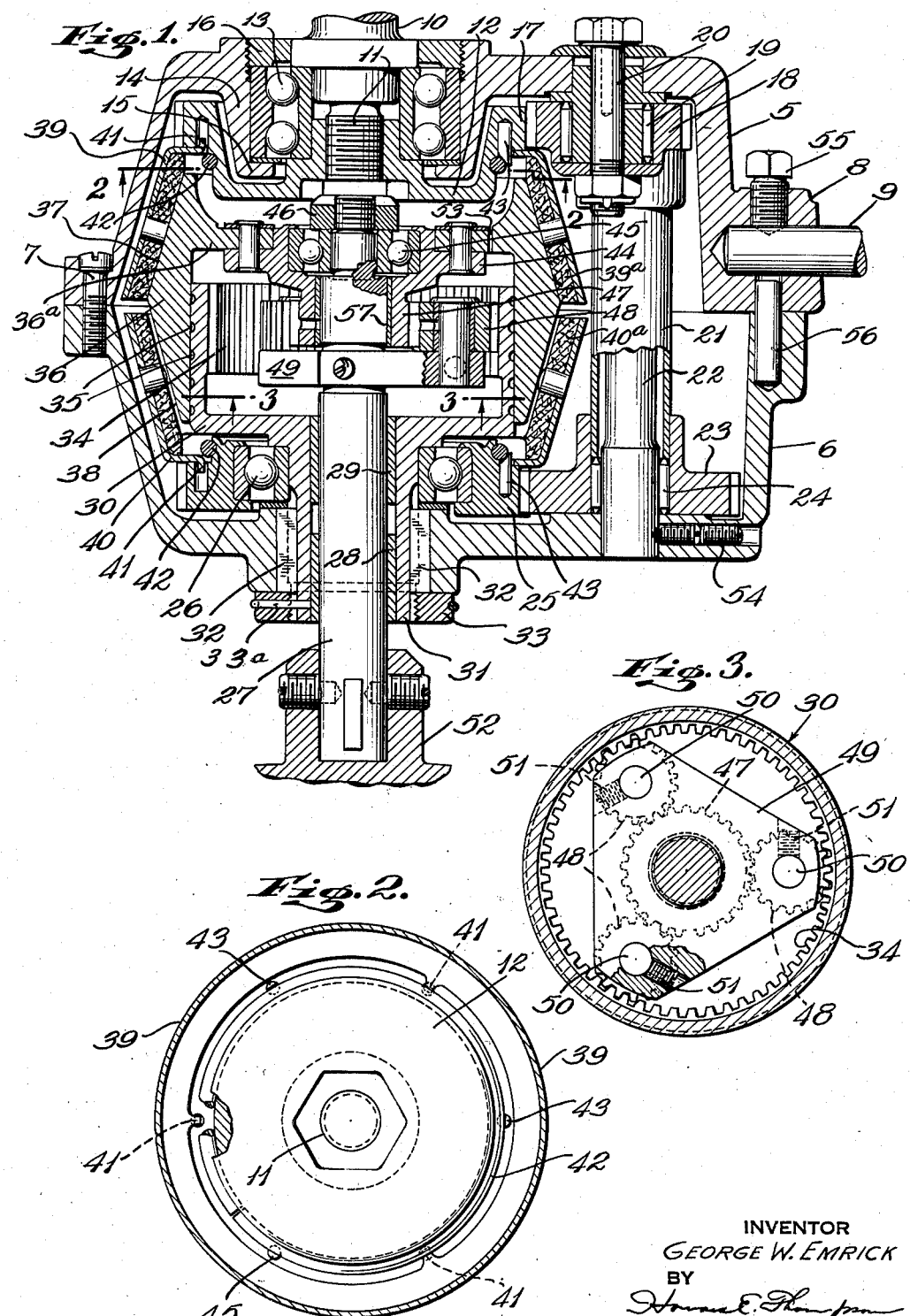
INVENTOR
GEORGE W. EMRICK
BY
ATTORNEY Patented June 13, 1939

2,162,251

UNITED STATES PATENT OFFICE 2,162,251

TAPPING ATTACHMENT

George W. Emrick, Brooklyn, N. Y.

Application December 16, 1938, Serial No. 246,131

16 Claims. (Cl. 74—298)

This invention relates to a tapping attachment of the general type and kind such as illustrated in my prior application Serial No. 121,280, filed January 19, 1937; and the object of the invention is to provide a tapping attachment of the character described with a driving cone including therewithin and as a part of the structure thereof planetary gearing for transmitting the drive of the cone to the driven shaft of the attachment so as to provide a planetary gear drive tapping attachment of the type and kind shown in my Patent #1,758,656, which will be considerably smaller in vertical dimensions thus providing a great amount of clearance room in a drill press between the attachment and the work supporting table while at the same time providing a strong and durable and economical form of construction; a still further object being to provide an attachment of the character described wherein the gears and bearings of the attachment may be well lubricated and the lubrication substantially sealed within the double forward and reverse drive conical clutch unit employed; and with these and other objects in view, the invention consists in an attachment of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is an irregular vertical sectional view through an attachment made according to my invention with parts of the construction broken away and with parts omitted.

Fig. 2 is a section substantially on the line 2—2 of Fig. 1 of the drawing and showing only a part of the construction; and, Fig. 3 is a sectional view substantially on the line 3—3 of Fig. 1 with part of the structure broken away.

In Fig. 1 of the drawing I have shown at 5 the top part of the casing of the tapping attachment and at 6 the bottom part, secured to the top part as seen at 7. The part 5 has a projecting boss 8 in which is secured the usual rod 9 employed for retaining the casing against rotation in the use of the attachment in a machine. At 10 I have shown part of the tapered drive spindle which is adapted to be coupled with the usual chuck or other coupling on the drill press or tapping machine; the spindle having within the casing a reduced threaded portion 11 with which is coupled a drive disc 12 having a double ball bearing mounting as at 13 in the bearing portion 14 of the top part 5. The bearing 14 is provided with an inturned flange or seat 15 for the ball bearing 13 and a sleeve nut 16 is employed to retain the bearing 13 against displacement. The drive disc may be said to be disc-shaped in form and includes an upwardly extending peripheral external gear portion 17 which is adapted to mesh with a pinion 18 having a roller bearing support 19 on a pin or bolt 20 in the casing part 5.

The pinion 18 meshes with another pinion, not shown, at the upper end of a sleeve 21 arranged upon a vertical shaft 22, and another gear or pinion 23 is secured to the lower end of the sleeve and has a roller bearing mounting as at 24 on the shaft 22 and meshes with a reverse drive gear 25 having a ball bearing mounting as at 26 around the driven shaft 27 of the attachment.

The shaft 27 is supported in two plain bearings or bushings 28, 29, in a substantially cup-shaped member 30 having a downwardly extending sleeve portion 31 keyed in the bottom casing part 6 as seen at 32, the lower end of the sleeve 31 being externally threaded to receive a retaining nut 33; a spring ring key pin 33a being employed to retain the nut against rotation.

The upper end of the cup-shaped member has an internal gear as seen at 34, and the outer surface of said member is provided with a series of circumferential grooves 35 forming oil grooves for lubricating the double-faced conical clutch 36 arranged and fitting snugly thereon, but free to rotate on the member 30. The conical clutch 36 has an upper beveled surface 37 and a lower beveled surface 38. Detachably coupled with the disc 12 and gear 25 are driving cones 39 and 40 respectively, each having key elements 41 fitting in recesses formed in the parts 12, 25 and being held in place by spring rings 42 which seat in grooves formed in the parts 12, 25, as clearly seen in Fig. 1, and one of which mountings is shown in detail in Fig. 2 of the drawing. A plurality of pins 43 are also arranged in each of the parts 12, 25, intermediate the key elements 41 and have outer beveled surfaces engaging the rings 42 to aid in retaining said rings against displacement. Each clutch shell 39, 40, carries on the inner surface thereof, frictional facings 39a, 40a, for engaging the beveled surfaces 37, 38, as in other devices of this kind.

Secured to an inwardly extending flange 36a on the clutch is a plate 44 having a ball bearing mounting as at 45 on the upper end of the shaft 27, said shaft being threaded to receive a nut 46 which supports the shaft against displacement as will be apparent. The lower end of the plate 44 carries an external gear 47 which meshes with three planetary gears 48 carried by a substantially triangular plate 49 integral with or fixedly secured to the shaft 27. The gears 48 are supported by pins 50 secured against displacement from the plate by set screws 51 as clearly illustrated in Fig. 3 of the drawing. The gears 48 also mesh with the internal gear 34 of the cup-shaped member 30.

A chuck body or other tool supporting device 52 is secured to and carried by the protruding end of the shaft 27 as is partially indicated in Fig. 1. At 53 is shown a vent opening into the chamber within the clutch 36 and the member 30, and at 54 is shown a set screw engaging the shaft 22 to retain the latter against rotation. The check rod 9 is also retained against displacement by a set screw 55, and at 56 is shown a key pin for keying the casing parts 5 and 6 at the point where the rod 9 is located.

The shaft 27 operates in a plain bushing or bearing 57 in the bore of the plate 44 in which the shaft is arranged so as to maintain the alinement of the shaft in the attachment.

By arranging the planetary gears within the clutch mechanism in the manner described, it is possible to produce an attachment of the character described which will economize as much as possible in the vertical dimensions of the attachment thus providing the greatest possible clearance room for workpieces that are arranged on the machine in performing a tapping or drilling operation; it being understood that the invention is primarily designed for use as a tapping attachment.

The operation of the attachment will be apparent to those skilled in the art, it being understood that in the direct drive of the attachment, the clutch 36 is in engagement with the friction surface 39a of the conical shell 39 whereas in the reverse drive, which is transmitted through the reverse drive cones, the clutch 36 is in engagement with the friction surface 40a of the conical shell 40. In all instances, the cup-shaped member 30, including the internal gear 34, is stationary; it being keyed to the casing as at 32. By providing the several ball and roller bearing mountings the free action of the various driven parts of the attachment is made possible. It will also appear that the arrangement of the planetary drive of the driven shaft 27 within the various other drives and the provision of the long bearing in the bushings 28, 29, also provide a smooth and well-balanced drive of the driven shaft.

It will further appear that the split spring retaining rings 42 provide for the quick attachment and detachment of the driving cones 39, 40, when the case parts 5 and 6 are separated, whenever it may be desired to repair or replace the friction surfaces 39a, 40a, it being understood that the shaft 27 carrying the clutch 36 is removed from the casing part 6 in accomplishing this result. However, the various mountings on the shaft and clutch 36 need not be disturbed. The cup-shaped member 30 will also be removed in removing the cone 40.

The teeth of the gear 34 on the stationary member 30 are of sufficient length to compenaste for the movement of the pinions 48 with the spindle 27 in the movement of the clutch into engagement with the respective shells. It will also appear that the clutch 36, the driven spindle or shaft 27, including the gear 47 and pinions 48, constitute a unit insertable into and removable from the casing when the casing parts 5 and 6 are separated and the chuck 52 removed.

Having fully described my invention, what I claim as new and desire to secure by Letters Patent, is:

1. A tapping attachment of the class described comprising a two-part casing, forward and reverse drive conical shells freely rotatable in the casing, a double-faced conical clutch disposed between and within said driving shells and movable toward and from the surfaces of said shells in the forward and reverse drives of the attachment, a drive spindle directly coupled with the forward drive shell, a driven shaft rotatably supported in the casing and freely rotatable in said clutch, means coupling the clutch with said driven shaft to move therewith in the movement of the shaft longitudinally of its axis, a cup-shaped member fixed to one casing part and disposed within said clutch and around which the clutch is rotatably mounted, and a planetary gearing between and disposed within said cup-shaped member and said clutch and operatively engaging the shaft to control the forward and reverse drive of the shaft through said forward and reverse drive conical shells.

2. A tapping attachment of the class described comprising a two-part casing, forward and reverse drive conical shells freely rotatable in the casing, a double-faced conical clutch disposed between and within said driving shells and movable toward and from the surfaces of said shells in the forward and reverse drives of the attachment, a drive spindle directly coupled with the forward drive shell, a driven shaft rotatably supported in the casing and freely rotatable in said clutch, means coupling the clutch with said driven shaft to move therewith in the movement of the shaft longitudinally of its axis, a cup-shaped member fixed to one casing part and disposed within said clutch and around which the clutch is rotatably mounted, a planetary gearing between and disposed within said cup-shaped member and said clutch and operatively engaging the shaft to control the forward and reverse drive of the shaft through said forward and reverse drive conical shells, said planetary gearing comprising an internal gear on said cup-shaped member, an external gear secured to and arranged within the clutch and said cup-shaped member and in spaced relation to said internal gear, and a plurality of gears supported on and movable with said driven shaft and meshing with said first mentioned internal and external gears.

3. A tapping attachment of the class described comprising a two-part casing, forward and reverse drive conical shells freely rotatable in the casing, a double-faced conical clutch disposed between and within said driving shells and movable toward and from the surfaces of said shells in the forward and reverse drives of the attachment, a drive spindle directly coupled with the forward drive shell, a driven shaft rotatably supported in the casing and freely rotatable in said clutch, means coupling the clutch with said driven shaft to move therewith in the movement of the shaft longitudinally of its axis, a cup-shaped member fixed to one casing part and disposed within said clutch and around which the clutch is rotatably mounted, a planetary gearing between and disposed within said cup-shaped member and said clutch and operatively engaging the shaft to control the forward and reverse drive of the shaft through said forward and reverse drive conical shells, said planetary gearing comprising an internal gear on said cup-shaped member, an external gear secured to and arranged within the clutch and said cup-shaped member and in spaced relation to said internal gear, a plurality of gears supported on and movable with said driven shaft and meshing with said first mentioned internal and external gears, each of said forward and reverse drive shells being detachable with respect to gear elements, and means placing said gear elements in operative engagement with each other.

4. A tapping attachment of the class described comprising a two-part casing, forward and reverse drive conical shells freely rotatable in the casing, a double-faced conical clutch disposed between and within said driving shells and movable toward and from the surfaces of said shells in the forward and reverse drives of the attachment, a drive spindle directly coupled with the forward drive shell, a driven shaft rotatably supported in the casing and freely rotatable in said clutch, means coupling the clutch with said driven shaft to move therewith in the movement of the shaft longitudinally of its axis, a cup-shaped member fixed to one casing part and disposed within said clutch and around which the clutch is rotatably mounted, a planetary gearing between and disposed within said cup-shaped member and said clutch and operatively engaging the shaft to control the forward and reverse drive of the shaft through said forward and reverse drive conical shells, said planetary gearing comprising an internal gear on said cup-shaped member, an external gear secured to and arranged within the clutch and said cup-shaped member and in spaced relation to said internal gear, a plurality of gears supported on and movable with said driven shaft and meshing with said first mentioned internal and external gears, each of said forward and reverse drive shells being detachable with respect to gear elements, means placing said gear elements in operative engagement with each other, said last named means being disposed within the casing outwardly of said shell and driving the reverse drive shell at a speed variable to that of the forward drive shell.

5. A tapping attachment of the class described comprising a casing composed of two detachable parts, a forward drive gear freely rotatable in one part and directly coupled with the drive spindle protruding through said part, a reverse drive gear freely rotatable in the other casing part, means within the casing parts placing the forward drive gear in operative engagement with the reverse drive gear, a conical shell coupled with each of said gears, a substantially cup-shaped member secured to the second named casing part and arranged within and in spaced relation to said conical shells, a driven shaft rotatably supported in said cup-shaped member and protruding outwardly through the second named part of the casing and extending into and beyond the inner end of said cup-shaped member, a double-faced clutch freely rotatable upon the inner end of the driven shaft and arranged between said shells and said cup-shaped member, means coupling the clutch with said driven shaft to move the clutch alternately into engagement with each of said shells in the forward and reverse drive of the driven shaft, a gear carried by and arranged within said clutch in spaced relation to said cup-shaped member, an internal gear on the inner surface of the cup-shaped member in alinement with said last named gear, and a plurality of pinions spaced circumferentially and movable with the driven shaft and in operative engagement with the last mentioned gear and said internal gear, and said last mentioned gear, internal gear, and pinions, forming a planetary gearing all disposed and operating within said cup-shaped member and said clutch.

6. In a tapping attachment employing a drive spindle, a driven shaft, forward and reverse drive conical shells in operative engagement with said drive spindle, and a double-faced clutch intermittently movable into engagement with said shells in the forward and reverse drive of the driven shaft, a planetary gear drive housed within said clutch for placing the clutch in operative engagement with the driven shaft, and part of said gear drive comprising a plurality of pinions rotatably supported on and movable with said driven shaft.

7. In a tapping attachment employing a drive spindle, a driven shaft, forward and reverse drive conical shells in operative engagement with said drive spindle, and a double-faced clutch intermittently movable into engagement with said shells in the forward and reverse drive of the driven shaft, a planetary gear drive housed within said clutch for placing the clutch in operative engagement with the driven shaft, part of said gear drive comprising a plurality of pinions rotatably supported on and movable with said driven shaft, a stationary tubular member arranged within said clutch and having an elongated internal gear surface in connection with which said pinions operate and are slidably movable in the axial movement of the driven shaft with respect to said tubular member.

8. In a tapping attachment employing a drive spindle, a driven shaft, forward and reverse drive conical shells in operative engagement with said drive spindle, and a double-faced clutch intermittently movable into engagement with said shells in the forward and reverse drive of the driven shaft, a planetary gear drive housed within said clutch for placing the clutch in operative engagement with the driven shaft, part of said gear drive comprising a plurality of pinions rotatably supported on and movable with said driven shaft, a stationary tubular member arranged within said clutch and having an elongated internal gear surface in connection with which said pinions operate and are slidably movable in the axial movement of the driven shaft with respect to said tubular member, and a gear on said clutch within said tubular member around said driven shaft and in operative engagement with said pinions.

9. In a tapping attachment employing a drive spindle, a driven shaft, forward and reverse drive conical shells in operative engagement with said drive spindle, and a double-faced clutch intermittently movable into engagement with said shells in the forward and reverse drive of the driven shaft, a planetary gear drive housed within said clutch for placing the clutch in operative engagement with the driven shaft, part of said gear drive comprising a plurality of pinions rotatably supported on and movable with said driven shaft, a stationary tubular member arranged within said clutch and having an elongated internal gear surface in connection with which said pinions operate and are slidably movable in the axial movement of the driven shaft with respect to said tubular member, a gear on said clutch within said tubular member around said driven shaft and in operative engagement with said pinions, and said driven shaft having a ball bearing mounting in said clutch.

10. In a tapping attachment employing a drive spindle, a driven shaft, forward and reverse drive conical shells in operative engagement with said drive spindle, and a double-faced clutch intermittently movable into engagement with said shells in the forward and reverse drive of the driven shaft, a planetary gear drive housed within said clutch for placing the clutch in operative engagement with the driven shaft, part of said gear drive comprising a plurality of pinions rotatably supported on and movable with said driven shaft, a stationary tubular member arranged within said clutch and having an elongated internal gear surface in connection with which said pinions operate and are slidably movable in the axial movement of the driven shaft with respect to said tubular member, a gear on said clutch within said tubular member around said driven shaft and in operative engagement with said pinions, said driven shaft having a ball bearing mounting in said clutch, and said driven shaft having a long bearing in said tubular member.

11. The combination with a tapping attachment of the character described employing a double-faced conical clutch cooperating with forward and reverse drive conical shells each driven from a drive spindle and a driven shaft actuated by said forward and reverse drive shells, of a planetary gearing housed within said clutch for placing the clutch in operative engagement with said driven shaft.

12. The combination with a tapping attachment of the character described employing a double-faced conical clutch cooperating with forward and reverse drive conical shells and a driven shaft actuated by said forward and reverse drive shells, of a planetary gearing housed within said clutch for placing the clutch in operative engagement with said driven shaft, a stationary tubular member having a part fitting snugly within said clutch, and said member having an internal gear forming part of said planetary gearing.

13. The combination with a tapping attachment of the character described employing a double-faced conical clutch co-operating with forward and reverse drive conical shells and a driven shaft actuated by said forward and reverse drive shells, of a planetary gearing housed within said clutch for placing the clutch in operative engagement with said driven shaft, a stationary tubular member having a part fitting snugly within said clutch, said member having an internal gear forming part of said planetary gearing, said clutch having an independently formed hub part fixedly secured thereto, said hub part having an external gear arranged within the clutch in alinement with the internal gear of said member, and said hub part having a plain and ball bearing mounting on said driven shaft.

14. In a tapping attachment employing forward and reverse drive conical shells in operative engagement with a drive spindle, of a driven unit comprising a driven shaft, a double-faced clutch freely rotatable on said driven shaft, a gear integrally coupled with the clutch and arranged around the driven shaft and within the boundaries of said clutch, a plurality of pinions supported on the driven shaft and rotatable bodily therewith and rotatable about independent axes, and said pinions meshing with said gear.

15. In a tapping attachment of the class described comprising a double-faced hollow conical clutch movable into engagement with forward and reverse drive shells, said forward and reverse drive shells being of the same construction and arranged in spaced edge to edge relationship, a driven shaft movable with the clutch and freely rotatable within said clutch, and means arranged within the hollow portion of the clutch and on said driven shaft for rotating said shaft when said clutch is driven through either the forward or reverse drive shells.

16. In a tapping attachment of the class described comprising a double-faced hollow conical clutch movable into engagement with forward and reverse drive shells, a driven shaft movable with the clutch and freely rotatable within said clutch, means arranged within the hollow portion of the clutch and on said driven shaft for rotating said shaft when said clutch is driven through either the forward or reverse drive shells, a fixed cup-shaped member arranged within the hollow clutch, and said last named means comprising a planetary gearing between the member, clutch and said shaft.

GEORGE W. EMRICK.